United States Patent
Kivijärvi et al.

(10) Patent No.: US 7,139,254 B2
(45) Date of Patent: Nov. 21, 2006

(54) TRANSMISSION OF CONNECTION SET-UP PARAMETERS IN PACKET DATA NETWORK

(75) Inventors: Jukka Kivijärvi, Madrid (ES); Antti Kangas, Oulu (FI)

(73) Assignee: Nokia Corporation, Espoo (FI)

( * ) Notice: Subject to any disclaimer, the term of this patent is extended or adjusted under 35 U.S.C. 154(b) by 1015 days.

(21) Appl. No.: 10/157,218

(22) Filed: May 28, 2002

(65) Prior Publication Data

US 2002/0176409 A1  Nov. 28, 2002

(30) Foreign Application Priority Data

May 28, 2001  (FI)  .................................. 20011110

(51) Int. Cl.
*H04Q 7/00*  (2006.01)

(52) U.S. Cl. ...................................... 370/328; 370/347

(58) Field of Classification Search ...................... None
See application file for complete search history.

(56) References Cited

U.S. PATENT DOCUMENTS

| | | | | |
|---|---|---|---|---|
| 5,930,241 A * | 7/1999 | Fried | ........................... | 370/328 |
| 5,987,322 A | 11/1999 | Gupta et al. | ................. | 455/432 |
| 6,463,055 B1 * | 10/2002 | Lupien et al. | ............... | 370/353 |
| 2002/0193139 A1 * | 12/2002 | Mildh et al. | ................. | 455/552 |

FOREIGN PATENT DOCUMENTS

| | | |
|---|---|---|
| EP | 0967740 A1 | 12/1999 |
| EP | 1098541 A1 | 5/2001 |
| WO | WO 98/32265 | 7/1998 |

OTHER PUBLICATIONS

"The GSM System For Mobile Communications", Mouly et al., 1992, ISBN:2-957190-07.
3GPPTS 04.18, V8.9.0 para. 10.5.2.37b "S1 13" Rest Octet.
3GPP TS 04.60 (relevant chapters5.5.2.1.2 and 5.5.2.2.).
3GPP TS 04.08.

* cited by examiner

*Primary Examiner*—Chau Nguyen
*Assistant Examiner*—Jung Park
(74) *Attorney, Agent, or Firm*—Perman & Green, LLP.

(57) ABSTRACT

A method for transmitting connection set-up parameters of a packet data network on broadcast control channels in a telecommunications system which includes at least one cell which uses a circuit-switched broadcast control channel and a packet-switched broadcast control channel. In addition, the telecommunications system includes at least one mobile station which supports the packet data network and is arranged to listen to at least one of the broadcast control channels. The connection set-up parameters of the packet data network are transmitted to mobile stations in the cell on both broadcast control channels, if the cell supports transmitting the connection set-up parameters of the packet data network on both a circuit-switched broadcast control channel and a packet-switched broadcast control channel.

4 Claims, 2 Drawing Sheets

```
< SI 13 Rest Octets > ::=
  { L | H
    < BCCH_CHANGE_MARK : bit (3) >
    < SI_CHANGE_FIELD : bit (4) >

{ 0 | 1  < SI13_CHANGE_MARK : bit (2) >
        < GPRS Mobile Allocation : GPRS Mobile Allocation IE > }      -- Defined in 3GPP TS 04.60

{ 0                                                                -- PBCCH not present in cell :
      < RAC : bit (8) >
      < SPGC_CCCH_SUP : bit >
      < PRIORITY_ACCESS_THR : bit (3) >
      < NETWORK_CONTROL_ORDER : bit (2) >
      < GPRS Cell Options : GPRS Cell Options IE >                     -- Defined in 3GPP TS 04.60
      < GPRS Power Control Parameters : GPRS Power Control Parameters struct >

| 1                    -- PBCCH present in cell :
      < PSI1_REPEAT_PERIOD : bit (4) >
      < PBCCH Description : PBCCH Description struct >
    }
    { null | L                                                         -- Receiver compatible with ealier release
      H                                                                -- Additions in release 99 :
      { 0 | 1 < PSI1_REPEAT_PERIOD : bit (4) >
          < PBCCH Description : PBCCH Description struct > }
      < SGSNR : bit > }
  }
  < spare padding > ;

< GPRS Power Control Parameters struct > ::=
  < ALPHA : bit (4) >
  < T_AVG_W : bit (5) >
  < T_AVG_T : bit (5) >
  < PC_MEAS_CHAN : bit >
  < N_AVG_I : bit (4) >;

< PBCCH Description struct > ::=
  <Pb : bit (4) >
  < TSC : bit (3) >
  < TN : bit (3) >
  { 00     -- BCCH carrier
  | 01    < ARFCN : bit (10) >
  | 1     < MAIO : bit (6) >} ;
```

Fig. 2

```
< DCCM PSI message content > ::=
  < PAGE_MODE : bit (2) >
  < PSI_MESSAGE_TYPE : bit (6) >
  < PSI_MESSAGE : < PSI message content > >
  < padding bits >
  ! < Distribution part error : bit (*) = < no string > > ;
```

Fig. 3

TRANSMISSION OF CONNECTION SET-UP PARAMETERS IN PACKET DATA NETWORK

FIELD OF THE INVENTION

The invention relates to packet data services of wireless telecommunications systems and especially to transmitting connection set-up parameters on broadcast control channels.

BACKGROUND OF THE INVENTION

The progress in wireless data transmission has more and more brought forth the need to transmit wirelessly not only calls but also different data applications. The circuit-switched connections used conventionally in mobile systems are, however, rather poorly suited for transmitting different burst-type data services, which is why packet-switched applications have also been developed for mobile systems. During the past few years, GSM 2+ phase standards, in which the new packet-switched data transmission service GPRS (General Packet Radio Service) is also defined, have been drafted for the European digital GSM (Global System for Mobile communication) mobile network, for instance. GPRS is a packet radio network utilizing the GSM network, which endeavors to optimize data packet transmission by means of GPRS protocol layers on the air interface between a mobile station and a GPRS network.

The GSM system comprises several different, typically unidirectional control channels, by means of which the network controls the operation of mobile stations. One such channel is the broadcast control channel BCCH, through which information is transmitted on the different cells of the network, such as identification information of the cell, identification information on the network, frequencies used in the cell, etc. Each base transceiver station BTS transmits information on a cell on a broadcast control channel of its own, to which all mobile stations in the area of the cell listen.

Correspondingly, specific control channels have also been designed for the GPRS system, one of which is the packet broadcast control channel PBCCH, whose task is to transmit system information to all GPRS mobile stations in the cell; just like BCCH does in the GSM network. When a GPRS mobile station is in idle mode, no data transmission resources have been allocated to it and it only listens to the broadcast control channel BCCH and the paging control channel PCH of the cell, or to the packet broadcast control channel PBCCH and the packet paging control channel PPCH, if the cell supports this GPRS control channel. If the cell does not support this PBCCH channel, which will be a very common situation when GPRS networks will be built on top of the GSM network, the GPRS mobile station listens to the GSM broadcast control channel BCCH. The used broadcast control channel, PBCCH or BCCH, is thus defined according to which broadcast control channel is available at each time in the cell of the GPRS mobile station.

A GPRS mobile station should thus support broadcast control channel reception on both the PBCCH channel and the BCCH channel. Then, if the cell uses the PBCCH channel, the network transmits the parameters used in the GPRS network to the mobile stations on said PBCCH channel only.

A problem with the arrangement described above is that if the GPRS mobile station cannot correctly receive system information transmitted on the PBCCH channel, it also cannot transmit or receive data packet transmissions according to GPRS. In the near future, when GSM networks will be updated to also support GPRS packet data services, a great risk exists that GPRS mobile stations which came out on the market before the PBCCH channel came to the networks will not work on the PBCCH channels to be built into the networks in the future, because it has not been possible to test them in field conditions. Thus, there also exists a great risk that GPRS mobile stations which came out on the market before the GPRS service was initiated will not work in the GPRS network after the PBCCH channels are taken into use in the new networks. The extremely significant drawback in this is that circuit-switched speech services will not work, either, in such GPRS mobile stations.

BRIEF DESCRIPTION OF THE INVENTION

It is thus an object of the invention to develop a method and an apparatus implementing the method so as to solve the above-mentioned problems. The object of the invention is achieved by a method and system which are characterized by what is stated in the independent claims. Preferred embodiments of the invention are set forth in the dependent claims.

The invention is based on the idea that if a cell supports the GPRS service on both BCCH and PBCCH channels, the network is configured to transmit the parameters required in a GPRS connection to GPRS mobile stations on both broadcast control channels. Such GPRS mobile stations that do not work on PBCCH channels to be built into the network, continue broadcast control channel reception only on the BCCH channel and paging reception on the PCH channel and receive through them the parameters required for using the GPRS service in spite of the fact that the cell may simultaneously also use a packet broadcast control channel PBCCH.

According to a preferred embodiment of the invention, this can be implemented by modifying the SI13 message transmitted on the BCCH channel in such a manner that it indicates that the cell supports the transmission of the GPRS parameters on both the BCCH channel and the PBCCH channel.

The method and system of the invention provide the advantage that it is possible to ensure the operation of GPRS mobile stations that come out on the market before the PBCCH channel will be taken in to use, in cells which will later on also use a PBCCH channel. A further advantage is that it is also possible to ensure that GPRS mobile stations to be developed later will also be capable of broadcast control channel reception on the PBCCH channel. A yet further advantage is that the PBCCH channels can be taken into use in GPRS networks as soon as network manufacturers can supply them, while at the same time making sure that the old GPRS mobile stations still work.

BRIEF DESCRIPTION OF THE FIGURES

In the following, the invention will be described by means of preferred embodiments and with reference to the attached drawings, in which FIG. 2 shows a message according to a preferred embodiment of the invention, and FIG. 3 shows a message according to a second preferred embodiment of the invention.

DETAILED DESCRIPTION OF THE INVENTION

Figure 1:
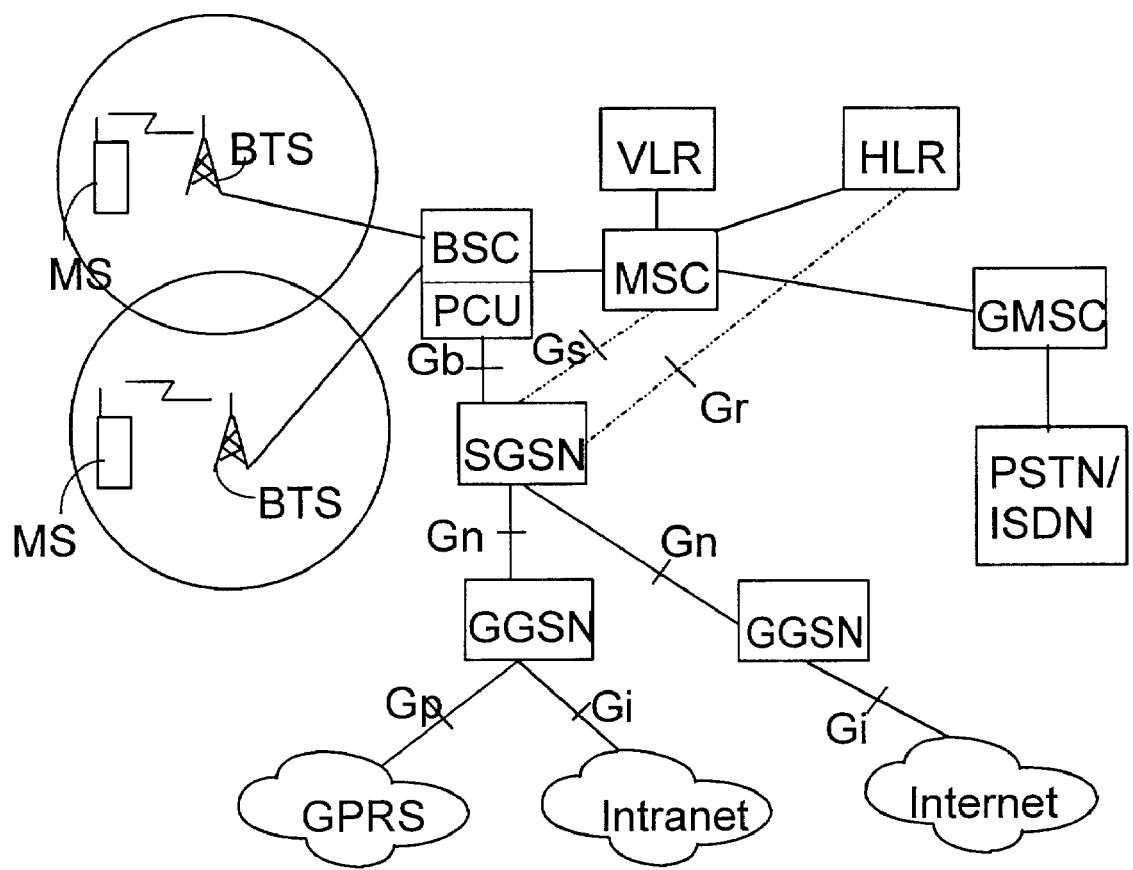
FIG. 1 shows a block diagram of the structure of the GSM/GPRS system.

In the following, the invention will be described by way of example based on the GSM/GPRS system. The invention is, however, not limited to the GSM/GPRS system, but can, for instance, be applied to what is known as the third-generation mobile system UMTS (Universal Mobile Telecommunication System) which comprises functions corresponding to the GPRS system and whose mobile stations should also support the data transmission of the GSM/GPRS system.

FIG. 1 illustrates how the GPRS system is built on the GSM system. The GSM system comprises mobile stations (MS) which have a radio connection to base transceiver stations (BTS). Several base transceiver stations BTS are connected to a base station controller (BSC) which controls the radio frequencies and channels available to them. The base station controller BSC and the base transceiver stations BTS connected to it form a base station subsystem (BSS). The base station controllers BSC are connected to a mobile services switching center (MSC) which takes care of connection establishment and call routing to correct addresses. In this, two databases containing information on mobile subscribers are used: a home location register (HLR) which contains information on all subscribers in the mobile network and the services they subscribe to, and a visitor location register (VLR) which contains information on mobile stations visiting the area of a given mobile services switching center MSC. The mobile services switching center MSC is, in turn, connected to other mobile services switching centers through a gateway mobile services switching center (GMSC) and to a public switched telephone network (PSTN). For a more detailed description of the GSM system, reference is made to the ETSI/GSM specifications and the book *The GSM system for Mobile Communications*, M. Mouly and M. Pautet, Palaiseau, France, 1992, ISBN:2-957190-07-7.

The GPRS system connected to the GSM system comprises two nearly independent functions, i.e. a gateway GPRS support node GGSN and a serving GPRS support node SGSN. The GPRS network can comprise several gateway and serving support nodes, and typically, several serving support nodes SGSN are connected to one gateway support node GGSN. Both support nodes, SGSN and GGSN, act as routers which support the mobility of the mobile station, control the mobile system and route data packets to the mobile stations regardless of their location and the used protocol. The serving support node SGSN is connected to the mobile station MS through the mobile network. The connection to the mobile network (interface Gb) is typically established through a base station controller BSC which typically comprises a packet control unit PCU, which creates the function required by the interface Gb in the base station controller BSC and controls the transmission of data packets onwards from the base station controller. A task of the serving support node SGSN is to detect mobile stations capable of GPRS connections in its service area, to transmit and receive data packets from said mobile stations and to monitor the location of mobile stations in its service area. The user data of all GPRS mobile stations in the service area of the serving support node SGSN thus goes through said serving support node. Further, the serving support node SGSN is connected to a short message switching center SMS-GSMC for incoming short messages through an interface Gd, and to the home location register HLR through an interface Gr, and possibly to the mobile switching center MSC and the visitor location register VLR through a signaling interface Gs. GPRS records comprising the contents of subscriber-specific packet data protocols are also stored in the home location register HLR.

The gateway support node GGSN acts as a gateway between the GPRS network and an external packet data network PDN. External packet data networks include the GPRS network of another network operator or the Internet. The gateway support node GGSN is connected to said packet data networks through interfaces Gp (another GPRS network) and Gi (other PDNs). Private local area networks are typically connected to one of said packet data networks through a router. Data packets transmitted between the gateway support node GGSN and the serving support node SGSN are always encapsulated according to the GPRS standard. The gateway support node GGSN also contains PDP (Packet Data Protocol) addresses and routing information, i.e. SGSN addresses, of the GPRS mobile stations. The routing information is used to link data packets between an external data packet network and the serving support node SGSN. The GPRS backbone network between the gateway support node GGSN and the serving support node SGSN is a network utilizing the IP protocol, either IPv4 or IPv6 (Internet Protocol, version 4/6).

The GSM system comprises several different, typically unidirectional control channels, by means of which the network controls the operation of mobile stations. One of these is the broadcast control channel BCCH, through which information on the different cells of the network, such as cell identification information, network identification information, frequencies used in the cell, etc., are transmitted. Each base transceiver station BTS transmits the cell information on its own broadcast control channel, to which all mobile stations in the area of the cell listen. Further, one control channel is a common control channel CCCH. CCCH can be divided into three logical channels: a paging channel PCH, an access grant channel AGCH and a random access channel RACH. Paging messages to mobile stations, for instance in connection with a call set-up initiated by the network, are transmitted on the paging channel PCH, and on the access grant channel AGCH the base transceiver station allocates to a mobile station an SDCCH channel for the allocation of a traffic channel to be used in a call. The structures of the paging channel PCH and the access grant channel AGCH are alike and the channels are used in turn according to a certain scheme, i.e. never simultaneously. Said control channels are allocated time division frames together with other logical control channels from the same control channel multiframe structure, to which different control channels are thus multiplexed as certain channel combinations.

The GPRS system correspondingly has its own packet broadcast control channel PBCCH and packet common control channel PCCCH. The task of the packet broadcast control channel PBCCH is to transmit system information to all GPRS mobile stations in the cell. Similar to the GSM common channel CCCH, the packet common control channel PCCCH comprises several logical control channels. These include a packet paging channel PPCH, packet access grant channel PAGCH and packet notification channel PNCH in the downlink direction (from the base transceiver station to the mobile station), and a packet random access channel PRACH in the uplink direction (from the mobile station to the base transceiver station). The packet paging channel PPCH is used to transmit paging messages to mobile stations before beginning a data packet transfer, if the location of the mobile station is not know at an accuracy of a cell. On the packet access grant channel PAGCH, a mobile station is allocated the channel resources available for transfer before beginning a data packet transfer. The packet notification channel PNCH is used to allocate resources for a point-to-multipoint (PTM) message before the PTM message is transmitted to a certain GPRS mobile station group.

When a GPRS mobile station is in packet-idle mode, no data transmission resources are allocated to it on the traffic channels and it only listens to the packet broadcast control channel PBCCH and packet paging channel PPCH of the cell, if the cell supports these GPRS control channels. If the cell in question does not support these GPRS control channels, said mobile station listens to the GSM control channels BCCH and PCH. The broadcast control channel to be used, PBCCH or BCCH, is thus determined by which broadcast control channel is available at each time in the cell of the GPRS mobile station.

If the packet broadcast control channel PBCCH is used, the network transmits on the PBCCH channel at regular intervals PSI (packet system information) messages which the GPRS mobile station receives regularly. Different types of PSI messages, such as 1, 2, 3, 3bis, 4 and 5, are used on the PBCCH channel. A PSI1 message can also be transmitted on the PPCH channel. From the PSI messages of the PBCCH channel, the mobile station MS can deduce, whether it can set up a packet data link in the cell in question and what parameters it should use to set up the connection and to operate in the cell. The most important one of these messages is the PSI1 message, by means of which the network notifies what the situation is at each time concerning packet data service support and what the sequencing of the PSI messages to be transmitted is. The PSI1 message comprises parameters PBCCH_CHANGE_MARK and PSI_CHANGE_FIELD, by means of which changes occurred in the content, update frequency and deletions/additions of the PSI message can be updated in such a manner that by increasing the parameter values in connection with the changes, the mobile stations are directed to update from the network the changed PBCCH values. This way, it is possible to force all mobile stations in the cell to update their PBCCH information at the same time.

The broadcast control channel BCCH can be used when the PBCCH channels is not available in the cell in question or when it is necessary to ensure connection to the network in a situation in which PBCCH is removed for some reason or its location in the cell changes. A mobile station then listens on the BCCH channel to SI (system information) messages at regular intervals, and especially to the SI13 message which enables the transmission of the necessary GPRS parameters to mobile stations. The parameters are then transmitted that are required for setting up a GPRS connection in a cell which has no PBCCH channel. If the cell in question does not support PBCCH, it is possible by means of the parameter BCCH_CHANGE_MARK in the SI13 message to update the changes occurred in the content of the SI messages and to force all mobile stations in the cell to update their BCCH information at the same time.

A GPRS mobile station should thus support broadcast control channel reception on both the PBCCH channel and the BCCH channel. In accordance with the above, if the cell uses the PBCCH channel, the network transmits the parameters to be used in a GPRS connection to the mobile stations only on said PBCCH channel. On the other hand, if the GPRS mobile station cannot receive correctly system information transmitted on the PBCCH channel, neither can it transmit or receive a data packet transmission according to GPRS. In such a case, using voice services may also be prevented. When the updating of GSM networks is started in the near future so as to make them also support the GPRS packet data service, but only on the BCCH and CCCH channels, a very high risk exists that GPRS mobile stations which came out on the market at the initial stage of the GPRS service will not work on the PBCCH channels to be built later into the network, since it has not been possible to test them in field conditions.

This can be avoided in such a manner that if a cell supports the GPRS service on both the BCCH channel and the PBCCH channel, the network is directed to transmit the parameters needed for a GPRS connection to GPRS mobile stations on both broadcast control channels. The GPRS mobile stations which do not work on PBCCH channels to be built in the network then continue broadcast control channel reception on the BCCH channel only and paging message reception on the PCH channel, and through them obtain the parameters required for using the GPRS service in spite of the fact that the cell may simultaneously also use the packet broadcast control channel PBCCH. All parameters related to the GPRS service are transmitted on the BCCH channel as if the PBCCH channel was not at all in use. On the other hand, the GPRS mobile stations to be developed later will also be capable of broadcast control channel reception on the PBCCH channel and packet paging message reception on the PPCH channel. This property, in which the network is capable of transmitting control commands related to connection set-up parameters of a packet data service on both circuit-switched and packet-switched control channels can be referred to by the term DCCM (dual control channel mode), for instance. This way, the PBCCH channels can be taken into use in GPRS networks as soon as network manufacturers can supply them, while at the same time making sure that that the GPRS mobile stations on the market now still work. The mobile stations which can change over to receiving the connection set-up parameters of a packet data service on the PBCCH channel, even though the network also transmits them on the BCCH channel, and change over to listening to the PPCH channel, can be called DCCM mobile stations. Mobile network cells, in which the parameters related to the GPRS service are transmitted on both the BCCH channel and the PBCCH channel, can correspondingly be called DCCM cells.

According to a preferred embodiment of the invention, this DCCM function can be implemented by means of the SI13 message transmitted on the BCCH channel. As shown in FIG. 2, the SI13 message comprises first a 3-bit BCCH_CHANGE_MARK field and after it a 4-bit SI_CHANGE_FIELD field. The next bit indicates whether an SI13_CHANGE_MARK field and channel allocation information (GPRS mobile allocation) are transmitted in this message. The next bit is used to indicate the broadcast control channels supported by the cell. The bit value 0 then indicates that the cell does not use the packet broadcast control channel PBCCH and the GPRS parameters are only transmitted on the BCCH channel by means of the information fields RAC, SPGC_CCCH_SUP, PRIORITY_ACCESS_THR, NETWORK_CONTROL_ORDER, GPRS Cell Options and GPRS Power Control Parameters. The operation of these information fields is not, however, essential for the implementation of the invention and they are described in greater detail in the document 3*GPP TS* 04.18, *V*8.9.0, *paragraph* 10.5.2.37*b "SI* 13 *Rest Octets."*

The bit value 1 is used to indicate that the GPRS parameters are transmitted in the cell on PBCCH channel only. The parameters are transmitted by defining the repetition period of the PSI1 message and the structure of the used PBCCH channel.

Supporting the DCCM operating mode of a cell, in other words, transmitting the GPRS parameters on both the BCCH channel and the PBCCH channel, can now be arranged by first setting the value of said bit to zero, which indicates that the GPRS parameters are transmitted on the BCCH channel. In addition to this, a new data structure (marked in bold in FIG. 2) is added to the extension part of the message, the data structure being one that only the GPRS mobile stations which will come out on the market later on can read and in which the network transmits the PBCCH parameters, i.e. information that the PBCCH/PCCCH channels are also in use in the cell in question, and information on where the PBCCH channel can be found. Such GPRS mobile stations that do not work on the PBCCH channels to be built into the network then perform broadcast control channel reception on the BCCH channel only and listen to paging messages on the PCH channel in spite of the fact that the cell also uses the packet broadcast control channel PBCCH simultaneously. This means that network operators can take PBCCH channels into use in GPRS networks as soon as network manufacturers can supply them.

Thus, by modifying the content of the SI13 message described above, a network operator can separately define the use of the BCCH and PBCCH broadcast control channels in transmitting the GPRS parameters. In the future, when the network operator is convinced that substantially all mobile stations in the network operate on the PBCCH channels, the GPRS parameters can then be transmitted on the PBCCH channel only.

If a GPRS mobile station is in packet transfer mode, control messages, PSI messages in particular, can also be transmitted from the network to the mobile station on a PACCH (packet associated control channel) channel which is an internal control channel, i.e. in-band channel, of a traffic channel PDTCH (packet data traffic channel). In such a case, the control messages are transmitted among the data packets that form the actual payload on the same physical channel. These messages are only intended for GPRS mobile stations which can listen to the packet control channel, i.e. DCCM mobile stations.

FIG. 3 shows an arrangement according to a preferred embodiment of the invention, by means of which this reception of PSI messages on the PBCCH and PACCH channels by DCCM mobile stations only can be implemented using PSI message encapsulation. So that only DCCM mobile stations would receive these messages, but the phones that have come out on the market earlier would not, PSI messages in a DCCM cell are encapsulated inside a DCCM PSI message. In the message shown in FIG. 3, the type of the PSI message to be encapsulated is defined in a PSI_MESSAGE_TYPE field and the actual PSI message to be encapsulated is attached to a PSI_MESSAGE field. The mobile stations that do not support the DCCM functionality then do not recognize the messages and reject them, whereas the DCCM mobile stations recognize them.

A PSI13 message, which is identical to the SI13 message, can also be transmitted on the PACCH channel. If the network makes changes to the inter-allocation of the PBCCH and CCCH channels, it can inform phones directly by transmitting a PSI13 message on the PACCH channel. Thus, in a DCCM cell, it is also possible to update a PSI13 message to correspond to the described content of the SI13 message.

It is obvious to a person skilled in the art that while technology advances, the basic idea of the invention can be implemented in many different ways. The invention and its embodiments are thus not restricted to the examples described above, but can vary within the scope of the claims.

The invention claimed is:

1. A method for transmitting connection set-up parameters of a packet data network on broadcast control channels in a telecommunications system which comprises at least one cell which uses a circuit-switched broadcast control channel (BCCH) and a packet-switched broadcast control channel (PBCCH), and at least one mobile station which supports the packet data network and is arranged to listen to at least one of said broadcast control channels, comprising:
   transmitting the connection set-up parameters of the packet data network to mobile stations in said cell on both broadcast control channels in response to the fact that the cell supports the transmission of the connection set-up parameters of the data packet network on both the circuit-switched broadcast control channel and the packet-switched broadcast control channel;
   indicating said connection set-up parameters of the packet data network to the mobile station in a message which is transmitted on one of said broadcast control channels only; wherein
   said packet data network is a GPRS system; and
   the GPRS connection set-up parameters are indicated to the mobile station in an SI13 message which is modified to comprise information on the broadcast control channels of the cell that support the packet data network and which message is transmitted on the circuit-switched broadcast control channel;
   wherein the information in the SI13 message on the broadcast control channels of the cell that support the packet data network comprises at least one of the following:
      the cell supports the packet data network on said packet-switched broadcast control channel;
      the cell does not support the packet data network on said packet-switched broadcast control channel; and
      the cell supports the packet data network on said packet-switched broadcast control channel and said circuit-switched broadcast control channel.

2. The method as claimed in claim 1, comprising:
   transmitting to the mobile stations in said cell the control messages to be transmitted on the packet data network traffic channel (PDTCH) encapsulated inside another control message in response to the fact that the cell supports transmitting the connection set-up parameters of the packet data network on both a circuit-switched broadcast control channel and a packet-switched broadcast control channel.

3. A telecommunications system which comprises a packet data network and at least one cell which uses a circuit-switched broadcast control channel (BCCH) and a packet-switched broadcast control channel (PBCCH), and at least one mobile station which supports the packet data network and is arranged to listen to at least one of said broadcast control channels, in which telecommunications system the connection set-up parameters of the packet data network are arranged to be transmitted on broadcast control channels, and the connection set-up parameters of the packet data network are arranged to be transmitted to mobile stations in said cell on both broadcast control channels in response to the fact that the cell supports transmitting the connection set-up parameters of the packet data network on both a circuit-switched broadcast control channel and a packet-switched broadcast control channel
   said connection set-up parameters of the packet data network are arranged to be indicated to the mobile station in a message which is arranged to be transmitted on only one of said broadcast control channels;

said packet data network is a GPRS system; and the GPRS connection set-up parameters are arranged to be indicated to the mobile station in an SI13 message which has been modified to contain information on the broadcast control channels of the cell that support the packet data network and which message is arranged to be transmitted on a circuit-switched broadcast control channel; wherein the information contained in the SI13 message on the broadcast control channels of the cell that support the packet data network comprises at least one of the following:

the cell supports the packet data network on said packet-switched broadcast control channel;

the cell does not support the packet data network on said packet-switched broadcast control channel;

the cell supports the packet data network on said packet-switched broadcast control channel and said circuit-switched broadcast control channel.

4. The telecommunications system as claimed in claim 3, wherein the control messages to be transmitted on the packet data network traffic channel (PDTCH) are arranged to be transmitted to the mobile stations in said cell encapsulated inside another control message in response to the fact that the cell supports transmitting the connection set-up parameters of the packet data network on both a circuit-switched broadcast control channel and a packet-switched broadcast control channel.

* * * * *